March 17, 1964  W. NICLAS ETAL  3,125,482
TIRE BUILDING MACHINE
Filed May 2, 1961  2 Sheets-Sheet 1
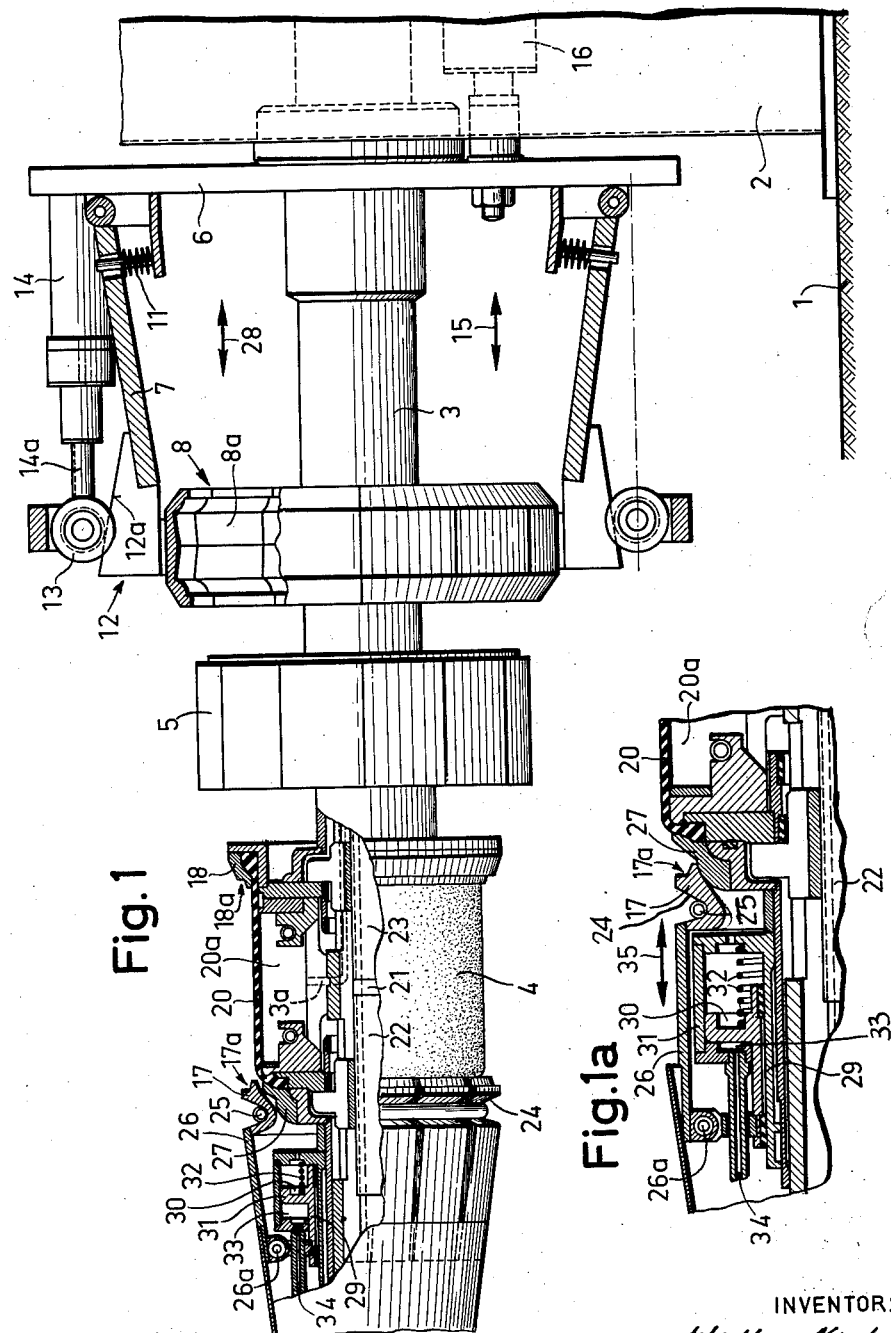
INVENTORS
Walter Niclas
Hans Menell
Günter Johannes March 17, 1964   W. NICLAS ETAL   3,125,482
TIRE BUILDING MACHINE
Filed May 2, 1961                                      2 Sheets-Sheet 2
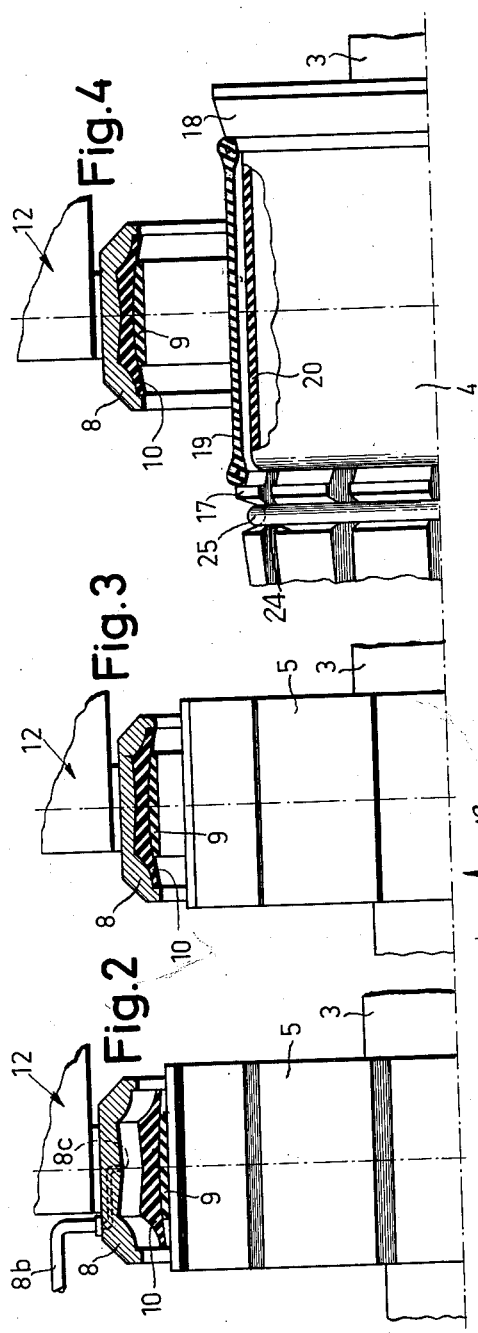
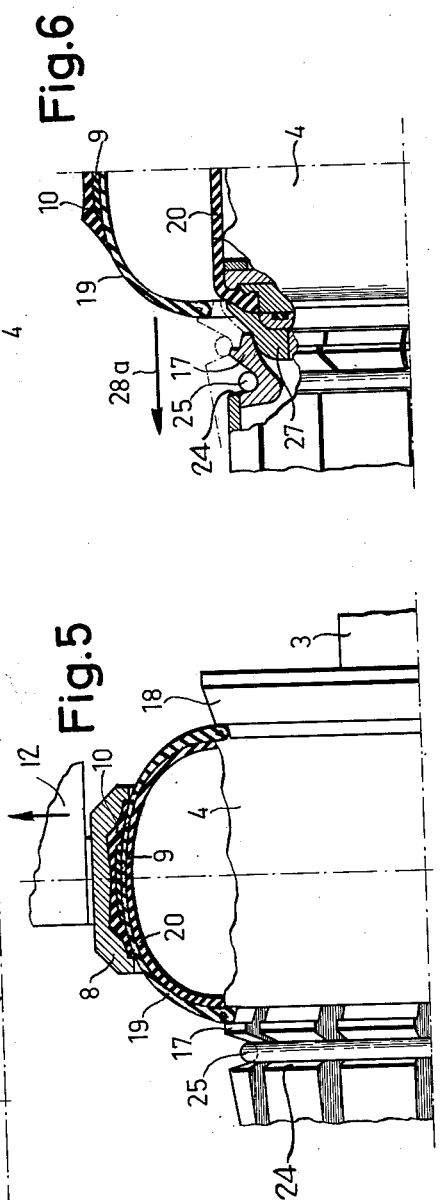
INVENTORS
Walter Niclas
Hans Menell
Günter Johannes
By 3,125,482
TIRE BUILDING MACHINE
Walter Niclas, Altwarmbuchen, near Hannover, Hans Menell, Ahlem, near Hannover, and Gunter Johannes, Hannover-Herrenhausen, Germany, assignors to Continental Gummi-Werke Aktiengesellschaft, Hannover, Germany
Filed May 2, 1961, Ser. No. 107,123
6 Claims. (Cl. 156—414)

The present invention relates to a machine for building pneumatic tires and, especially for building up the uncured body of a so-called belted tire, in which there is provided above the carcass an intermediate structure comprising an annular belt or breaker comprising strong cords, strands or the like.

With heretofore known tire building machines for building tires of the above mentioned type, the intermediate structure of the tire, together with the tread strip surrounding the same, is held by annular bodies which hold said intermediate structure from the inside within the area of its marginal portions. This heretofore known arrangement has the drawback that, when enlarging the diameter of the tire carcass, the latter can contact the intermediate structure along that area only which is located between the holding parts of said annular bodies. Moreover, no intensive pressure can be produced between the carcass and said intermediate structure because the latter is able to yield and thus to enlarge its diameter within certain limits.

It is, therefore, an object of the present invention to provide a tire building machine of the above mentioned general type, which will overcome the drawbacks outlined above.

It is a further object of this invention to provide a machine for building up pneumatic tires, in which the holding means for the intermediate structure and, if desired also the tread strip, will be so designed that the entire width of the inner surface of the intermediate structure will be able to be contacted by the carcass.

These and other objects, and advantages of the invention will appear more clearly from the following specification in connection with the accompanying drawings, in which:

FIG. 1 illustrates partly in section and partly in elevation a tire building machine according to the invention for building up belted tires.

FIG. 1a is a fragmentary view of the cross section of FIG. 1 on an enlarged scale, showing certain elements moved to a different position.

FIGS. 2 to 6 diagrammatically illustrate various working positions of the machine of FIG. 1.

The tire building machine according to the present invention is characterized primarily in that the holding means are adapted to extend around the intermediate structure and if desired around both the intermediate structure and the tread strip. In this way, the inner surface of the intermediate structure will be left completely exposed so that when the diameter of the carcass is enlarged, said carcass will be able to contact the entire inner surface of the intermediate structure. Due to the completely exposed inner surface of the intermediate structure, the latter may be provided with a coat, for instance with a solvent, prior to the increase in the diameter of the carcass. Moreover, the present invention furnishes the possibility to form the holding means annularly surrounding the intermediate structure in such a rigid way that said holding means will not yield when the diameter of the carcass is enlarged or when the pressure between the carcass and said intermediate structure is increased. Undesired deformation of the intermediate structure and the tire tread wall also be prevented. Moreover, the holding means may be so designed and may have such an inner contour that the latter will correspond to the desired outer contour of the tread strip.

Preferably, the diameter of the holding means is variable so as to permit the operator to grasp from the outside the intermediate structure, if desired with tire tread, as it was built up on a drum. An enlargement of the diameter is advantageous when the building up of the tire body has been effected and the latter is to be withdrawn from its drum. The holding means after enlarging the diameter thereof, may then be moved toward the side, prior to the withdrawal of the tire body.

Referring now to the drawings in detail, FIG. 1 shows a foundation 1 having connected thereto a machine frame 2 in which is journalled a horizontal machine shaft 3. The free end of shaft 3, which is preferably hollow, carries a building-up drum 4 which is arranged adjacent an auxiliary drum 5 composed of segments and adapted to enlarge and reduce its diameter.

In the neighborhood of the machine frame 2 there is mounted on shaft 3 a plate 6 which is axially displaceable on shaft 3. The said plate 6 has mounted thereon and distributed over the marginal portion thereof a plurality of levers 7 pivotally connected to plate 6. Each of the levers 7 carries a segment 8a of the annular holding means 8 for the intermediate structure 9 and the tread strip 10. As will be evident from the drawings, the levers 7 are continuously urged by pressure springs 11 to move in an outward direction. The extent to which the levers 7 may move outwardly, and thereby the diameter of the holding means 8, is determined by cams 12 having cam surfaces 12a. The cam surfaces 12a are engaged by rollers 13 which in their turn are carried by plungers 14a reciprocably mounted in cylinders 14. These cylinders 14 are adapted to be supplied with pressure fluid for moving the plungers 14a and thereby the rollers 13 in one or the other direction parallel to shaft 3 to thereby determine the diameter of the holding means 8. The entire holding means 8 together with the parts 7, 13 and 14 as well as plate 6 may be moved selectively in one or the other direction as indicated by the double arrow 15. This movement is effected by means of a cylinder piston system 16 which is supported by the machine frame 2.

The building drum 4 comprises a solid ring 18 and a segmented ring 17 having surfaces 18a and 17a respectively for receiving the marginal portions of the tire carcass 19. The segments of ring 17 rest on an abutment ring 27 and rings 27 and 18 are connected to each other by an inflatable body 20. There is furthermore arranged in shaft 3 a spindle 21 which is provided with a right-hand thread 22 and a left-hand thread 23. Inasmuch as the rings 27 and 18 threadedly engage said thread portions 22 and 23, it is possible by rotation of spindle 21 to vary the distance between said rings 27 and 18. Furthermore it is possible at the same time to introduce a pressure fluid, as for instance compressed air, into the chamber confined by the inflatable body 20. Ring 17, it will be noted, is carried with ring 27.

The segmented ring 17, shown in maximum diameter position in FIGURE 1, is composed of segments which are adjustable relative to each other for varying the diameter of said ring 17. Ring 17 has a circumferential groove 24 in which is mounted a helical tension spring 25 continuously urging ring 17 against the abutment 27. It is furthermore important that the pivot pins 26a for the segments 26 of ring 17 are axially displaceable with regard to machine shaft 3.

The operation of the machine and the building-up of the belted tire is effected in the following manner. The intermediate tire structure 9 for the tire is in conformity with FIG. 2 built up on the auxiliary drum 5 having its diameter enlarged. Thereupon, the tire tread strip 10 is placed upon the intermediate structure 9. The next step consists in moving the holding means, with the segments 8 thereof adjusted to the maximum diameter, in the direction of the arrow 28 above the auxiliary drum 5 so that the segments 8 of the holding means occupy the position shown in FIG. 2. This movement of the holding means is effected by moving plate 6 by means of cylinder piston system 16. The diameter of the holding means, i.e. its segments 8, will then be reduced so that the inner surface of segments 8 (FIG. 3) formed in conformity with the outer surface of tread strip 10 will contact the latter. The connection of the tread strip 10 with the intermediate structure 9 may be improved by a suction effect. To this end, the segments are provided with suction connections for withdrawing air in such a way that the tread strip 10 together with the intermediate structure will be firmly held by the holding means, i.e. segments 8a. After the diameter of the auxiliary drum 5 has been reduced and the tire carcass 19 has been transferred to the building-up drum 4, i.e. the carcass 19 occupies the position shown in FIG. 4, the holding means will be moved over the central portion of carcass 19. This position is fixed by an abutment limiting the movement of the holding means.

By moving the rings 27 and 18 together, and by introducing compressed air into the inflatable body 20, the carcass 19 will be deformed and the diameter of its central portion will be considerably enlarged so that, in conformity with FIG. 5, the carcass will engage the intermediate structure 9 and the tread strip 10. Thereupon, the diameter of the holding means is increased, and the segments 8 are returned to the FIG. 1 position.

Even though the connection of the intermediate structure 9 with the tread strip 10 and carcass 19 will then be completed, it is, of course, possible to perform further working operations on the now built-up tire of FIG. 5.

After the pressure within the inflatable body 20 has been reduced and the rings 27 and 18 have been moved away from each other, the segments forming ring 17 are then moved inwardly in the direction toward machine shaft 3 so that the diameter of ring 17 will be reduced according to FIG. 6 to such an extent that the built-up tire can be freely withdrawn from the building-up drum 4 in the direction of the arrow 28a without being impeded by ring 17. The adjustability of ring 17 is of particular importance. Ring 17 is also advantageous in connection with such machines in which the holding means for the intermediate structure and tread strip engage said intermediate structure and tread strip from the inside.

The pivot pins 26a for the segments 26 of the ring 17 are connected with a sleeve 29 having a piston 30 within a cylinder 31. On one side of the piston 30 is a compression spring 32, on the other side an air-chamber 33, into which air-pressure can be admitted by a passage 34.

According to FIG. 1 air-pressure is admitted to the chamber 33 so that the sleeve 29 and the pivot pins 26a are moved rightwardly to such a position that the segments 26 of the ring 17 are carried outwardly by ring 27 to a diameter equivalent to that of ring 18. When the air-pressure within the chamber 33 is released the sleeve 29 together with the pivot pins 26a and the segments 26 are moved in the direction of the arrow 35. During this movement under the action of the spring 32 the ends of the segments 26 which make up segmented ring 17 slide inwardly on the abutment 27 so that the diameter of the ring 17 is reduced, as shown in FIGS. 1a and 6. It is mentioned that the tilting movement of the segments 26 is possible by the pivot pins 26a.

As shown in FIG. 2 the segments 8 are provided with a pipe connection 8b and a bore 8c terminating at the inside of said segments in order to withdraw the air in such a way that the tread strip together with the intermediate structure will be firmly held.

According to FIG. 1 within the shaft 3 is a passage 3a (shown in dotted lines) leading to the chamber 20a surrounded by the inflatable body 20. The air-pressure within the chamber 20a is controlled by suitable valves (not shown) associated with the passage within the machine frame 2 in which the other end of the passage 3a terminates.

It is, of course, to be understood that the present invention is, by no means, limited to the particular construction shown in the drawings but also comprises any modifications within the scope of the appended claims.

What we claim is:

1. In a tire building machine; a frame, a tire building drum for receiving a tire carcass, an auxiliary drum larger than the tire building drum for receiving thereon a tread to be placed on a carcass on the tire building drum, and a tread holding means larger than said auxiliary drum for receiving therein a tread from said auxiliary drum and transferring it to a carcass on said tire building drum, said drums and tread holding means being in positions of parallel spaced coaxial relation in said frame with the tire building drum remote from the frame and having one side exposed for the removal of a tire therefrom, means in the frame movably interconnecting said drums and tread holding means for relative axial movement thereof to bring said tread holding means from said position of spaced relation to said drums into selective coplanar surrounding relation with said respective drums, said auxiliary drum being radially expansible and contractable, means located externally of said tread holding means for selectively radially expanding and contracting said tread holding means, said tire building drum comprising axially spaced bead rings having bead supporting surfaces facing each other and a flexible cylindrical member fixed to and extending between said rings, means for supplying fluid under pressure to the inside of said cylindrical member to expand said cylindrical member radially, the one said bead ring on said one side of said tire building drum being radially collapsible to permit a completed tire to be removed from said one side of said tire building drum, and means for collapsing said one bead ring.

2. A machine according to claim 1 in which said tread holding means is segmented, and said means for expanding and contracting said tread holding means comprises cam and roller means one of which is mounted on each segment of the holding means and the other of which is movable relative thereto to effect positioning of the segments.

3. A machine according to claim 1 in which the said drums are stationarily mounted in spaced relation in the frame while said tread holding means is reciprocable in the frame.

4. A machine according to claim 1 in which the said drums are stationarily mounted in spaced relation in the frame while said tread holding means is reciprocable in the frame, and abutment means for abutting and halting said holding means in coplanar relation to said tire building drum.

5. A machine according to claim 1 in which said one bead ring is segmented, said tire building drum having a tapered end surface on which said one bead ring rests, and said means for collapsing said one bead ring including means to move the said one bead ring axially relative to the drum whereby the segments thereof slide down said tapered end surface.

6. A machine according to claim 1 in which said one bead ring is segmented, said tire building drum having a tapered end surface on which said one bead ring rests, and said means for collapsing said one bead ring including spring means urging said segments inwardly and means to move the said one bead ring axially relative to the drum whereby the segments thereof slide down said tapered end surface.

References Cited in the file of this patent

UNITED STATES PATENTS

| Re. 19,895 | State | Mar. 24, 1936 |
| 1,734,023 | Smith | Oct. 29, 1929 |
| 2,974,714 | Kraft | Mar. 14, 1961 |
| 2,986,196 | Frazier | May 30, 1961 |

FOREIGN PATENTS

| 563,382 | Italy | May 28, 1957 |
| 217,997 | Australia | June 12, 1958 |